United States Patent
Wan et al.

(10) Patent No.: US 12,069,118 B2
(45) Date of Patent: Aug. 20, 2024

(54) STREAMING MEDIA PROCESSING METHOD, TRANSMITTING DEVICE AND RECEIVING DEVICE

(71) Applicant: Sercomm Corporation, Taipei (TW)

(72) Inventors: Junyu Wan, Jiangsu (CN); Shaohai Zhao, Jiangsu (CN)

(73) Assignee: Sercomm Corporation, Taipei (TW)

( * ) Notice: Subject to any disclaimer, the term of this patent is extended or adjusted under 35 U.S.C. 154(b) by 0 days.

(21) Appl. No.: 18/181,566

(22) Filed: Mar. 10, 2023

(65) Prior Publication Data
US 2023/0308497 A1    Sep. 28, 2023

(30) Foreign Application Priority Data
Mar. 23, 2022    (CN) .......................... 202210286318.5

(51) Int. Cl.
*H04L 65/70*    (2022.01)
*H04L 65/65*    (2022.01)
*H04L 65/75*    (2022.01)
*H04L 69/04*    (2022.01)

(52) U.S. Cl.
CPC .............. *H04L 65/70* (2022.05); *H04L 65/65* (2022.05); *H04L 65/75* (2022.05); *H04L 69/04* (2013.01)

(58) Field of Classification Search
CPC ......... H04L 65/70; H04L 65/75; H04L 65/65; H04L 69/04
See application file for complete search history.

(56) References Cited

U.S. PATENT DOCUMENTS

| 8,854,491 | B2 * | 10/2014 | Ford | H04N 23/611 |
| | | | | 348/211.3 |
| 8,973,075 | B1 * | 3/2015 | Willis | H04N 21/64322 |
| | | | | 348/700 |
| 9,549,152 | B1 * | 1/2017 | Nayyar | H04L 65/403 |
| 10,136,166 | B1 * | 11/2018 | Wang | H04N 9/8205 |
| 10,747,418 | B2 | 8/2020 | Pieper et al. | |
| 2012/0321273 | A1 * | 12/2012 | Messmer | H04N 9/8205 |
| | | | | 386/E5.028 |
| 2015/0304282 | A1 * | 10/2015 | Xu | H04L 63/0272 |
| | | | | 713/153 |

(Continued)

FOREIGN PATENT DOCUMENTS

| CN | 1631040 | 6/2005 |
| CN | 1949876 | 4/2007 |

(Continued)

OTHER PUBLICATIONS

"Office Action of China Counterpart Application", issued on Dec. 23, 2023, p. 1-p. 11.

*Primary Examiner* — Dhairya A Patel
(74) *Attorney, Agent, or Firm* — JCIPRNET

(57) ABSTRACT

A streaming media processing method, a transmitting device and a receiving device are provided. The streaming media processing method includes the following steps: encoding original media data into encoded streaming media; adding metadata to a media frame in the encoded streaming media to generate a padded streaming media, and the metadata serves as a payload data of the media frame; and encapsulating the padded streaming media into a streaming media packet. In this way, it is possible to satisfy the requirement of compatibility without affecting codec and communication protocols.

10 Claims, 4 Drawing Sheets

(56) References Cited

U.S. PATENT DOCUMENTS

| | | | |
|---|---|---|---|
| 2016/0164929 A1 | 6/2016 | Bhalerao et al. | |
| 2016/0337707 A1* | 11/2016 | Oh | H04N 21/6125 |
| 2018/0034583 A1* | 2/2018 | Low | H04L 1/0045 |
| 2018/0190323 A1* | 7/2018 | de Jong | G11B 27/034 |
| 2018/0255332 A1 | 9/2018 | Heusser | |
| 2018/0262701 A1* | 9/2018 | Woody | H04N 21/23602 |
| 2019/0364087 A1* | 11/2019 | Smith | H04L 65/75 |
| 2020/0177659 A1 | 6/2020 | Åström et al. | |
| 2020/0344278 A1* | 10/2020 | Mackell | H04N 7/15 |
| 2020/0389722 A1 | 12/2020 | Zielinski et al. | |
| 2022/0053216 A1* | 2/2022 | Yip | H04N 21/84 |
| 2022/0070062 A1* | 3/2022 | MeLampy | H04L 45/66 |
| 2023/0188732 A1* | 6/2023 | Völcker | H04N 21/835 |
| | | | 382/232 |

FOREIGN PATENT DOCUMENTS

| | | |
|---|---|---|
| CN | 101312531 | 11/2008 |
| CN | 1756369 | 6/2010 |
| CN | 101120590 | 10/2010 |
| CN | 102056015 | 5/2011 |
| CN | 102256175 | 11/2011 |
| CN | 103188522 | 7/2013 |
| CN | 101873255 | 5/2014 |
| CN | 102638402 | 4/2015 |
| CN | 102956233 | 7/2015 |
| CN | 107872422 | 1/2020 |
| CN | 112204975 | 1/2021 |
| CN | 112653700 | 4/2021 |
| KR | 20130084345 | 7/2013 |

* cited by examiner

STREAMING MEDIA PROCESSING METHOD, TRANSMITTING DEVICE AND RECEIVING DEVICE

CROSS-REFERENCE TO RELATED APPLICATION

This application claims the priority benefit of China application serial no. 202210286318.5, filed on Mar. 23, 2022. The entirety of the above-mentioned patent application is hereby incorporated by reference herein and made a part of this specification.

BACKGROUND

Field of the Disclosure

The present disclosure relates to a digital media processing technology, in particular, to a streaming media processing method, a transmitting device and a receiving device.

Description of Related Art

In generating and transmitting standard audio or video streams by digital cameras, mobile phones or surveillance cameras, adding metadata is demanded to facilitate analysis or provide additional information when audio or video is played. None of these added metadata falls within the specification of the standard protocol definition. Although some different adding methods are available in the market, most of them adopt limited transmission protocols or file formats, which might result in failure to display metadata or a decrease in compatibility.

SUMMARY OF THE DISCLOSURE

The present disclosure is related to a streaming media processing method, a transmitting device and a receiving device, through which the metadata transmitted along with the data stream may be defined beyond the specification of existing streaming media format.

According to an embodiment of the present disclosure, the method for processing streaming media includes (but is not limited to) the following steps: encoding original media data into encoded streaming media; adding metadata to the end of a media frame in the encoded streaming media to generate a padded streaming media, and the metadata serves as a payload data of a media frame; and encapsulating the padded streaming media into a streaming media packet.

According to an embodiment of the present disclosure, the method for processing streaming media includes (but not limited to) the following steps: receiving a streaming media packet through a network; obtaining a padded streaming media from the streaming media packet; obtaining metadata from the end of the media frame in the padded streaming media, and the metadata serves as the payload data of the media frame in the padded streaming media, and the original data of the media frame is generated by encoding the original media data.

According to an embodiment of the present disclosure, a transmitting device includes, but is not limited to, a memory, a digital signal processor, a transceiver, and a main processor. The memory is configured to store program codes. The main processor is coupled to the memory, the digital signal processor and the transceiver, and is configured to load and execute program codes to perform the following steps: encoding, by the digital signal processor, original media data into encoded streaming media; adding, by the transceiver, metadata to the end of a media frame in the encoded streaming media to generate a padded streaming media, and the metadata serves as a payload data of a media frame; and encapsulating the padded streaming media into a streaming media packet.

According to an embodiment of the present disclosure, a receiving device includes (but is not limited to) a memory, a transceiver and a main processor. The memory is configured to store storing program codes. The main processor is coupled to the memory and the transceiver, and is configured to load and execute the program codes to perform the following steps: receiving, by the transceiver, a streaming media packet through a network; obtaining, by the transceiver, a padded streaming media from the streaming media packet; obtaining metadata from the end of the media frame in the padded streaming media, and the metadata serves as the payload data of the media frame in the padded streaming media, and the original data of the media frame is generated by encoding the original media data.

Based on the above, according to the streaming media processing method, transmitting device and receiving device in the embodiments of the present disclosure, the transmitting device uses the metadata to be added as new data of the media frame, and the receiving device may extract the metadata from the padded streaming media. In this way, added information may be effectively brought to the receiving end or server without relying on the transmission protocol and file format.

BRIEF DESCRIPTION OF THE DRAWINGS

The accompanying drawings are included to facilitate understanding of the disclosure, and are incorporated in and constitute a part of this specification. The drawings illustrate embodiments of the disclosure and, together with the description, serve to explain principles of the disclosure.

DESCRIPTION OF EMBODIMENTS

Figure 1:
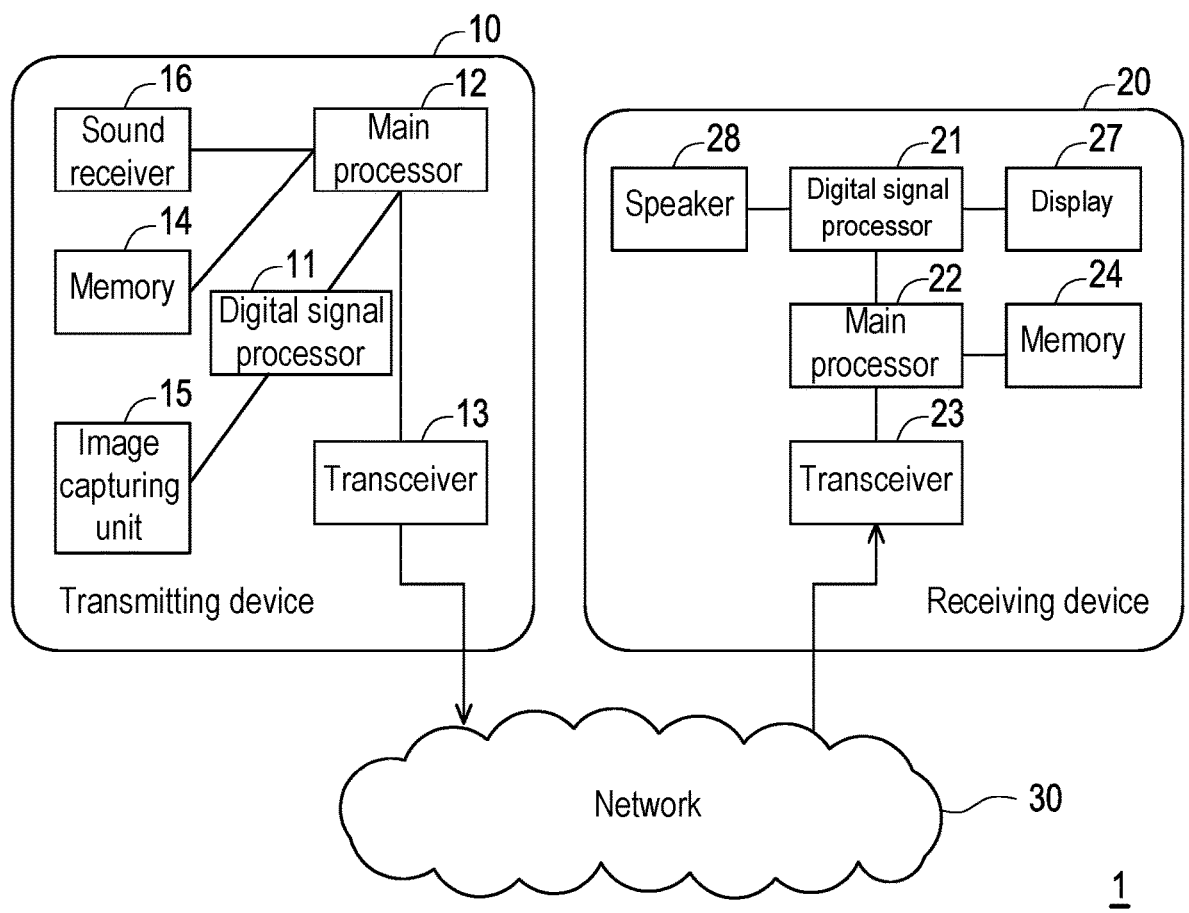
FIG. 1 is a block diagram of components of a system according to an embodiment of the disclosure.

Reference will now be made in detail to the exemplary embodiments of the present disclosure, examples of which are illustrated in the accompanying drawings. Wherever possible, the same reference symbols are used in the drawings and descriptions to refer to the same or like parts.

FIG. 1 is a block diagram of components of a system 1 according to an embodiment of the disclosure. Referring to FIG. 1, a system 1 includes (but not limited to) a transmitting device 10, a receiving device 20 and a network 30.

The transmitting device 10 may be a surveillance camera (or referred to as IP camera), a server or other computing devices. The surveillance camera may be a security camera, a video doorbell, a dashboard camera (or referred to as dashcam), or other cameras. The transmitting device 10 includes (but not limited to) a digital signal processor (DSP) 11, a main processor 12, a transceiver 13 and a memory 14. The digital signal processor 11 is a processor especially for digital signal processing, such as audio codec, video codec or image codec. The main processor 12 is coupled to the digital signal processor 11. The main processor 12 may be a central processing unit (CPU), a graphic processing unit (GPU), or other programmable general-purpose or special-purpose microprocessor, a programmable controller, a field programmable gate array (FPGA), an application-specific integrated circuit (ASIC), a neural network accelerator or other similar components or a combination of the above components. In an embodiment, the main processor 12 is configured to execute all or part of the operations of the transmitting device 10, and may load and execute various program codes, software modules, files and data recorded in the memory 14. In an embodiment, the digital signal processor 11 is embedded in the main processor 12. In another embodiment, the functions of the digital signal processor 11 may be implemented by the main processor 12.

The transceiver 13 is coupled to the main processor 12. The transceiver 13 is, for example, a transceiver supporting wired networks such as Ethernet, optical fiber network, or cable, and may include (but not limited to) components such as connection interfaces, signal converters, and communication protocol processing chips. The transceiver 13 may also be a transceiver supporting wireless networks such as Wi-Fi, fourth generation (4G), fifth generation (5G) or latter generation mobile networks, which may include (but not limited to) antennas, digital-to-analog/analog-to-digital converters, communication protocol processing chips and other components. In an embodiment, the transceiver 13 is configured to transmit or receive data through the network 30.

The memory 14 is coupled to the main processor 12. The memory 14 may be any type of random access memory (RAM), read-only memory (ROM), flash memory, conventional hard disk drive (HDD), solid-state drive (SSD) or similar components. In an embodiment, the memory 14 is configured to store program codes, software modules, configurations, data (e.g., original media data, encoded streaming media, or metadata, etc.) or files.

In an embodiment, the transmitting device 10 further includes an image capturing unit 15. The image capturing unit 15 is coupled to the main processor 12 through the digital signal processor 11. The image capturing unit 15 may be an image sensor. In an embodiment, the image capturing unit 15 is configured to record video to generate video data (i.e., original media data).

In an embodiment, the transmitting device 10 further includes a sound receiver 16. The sound receiver 16 may be a dynamic microphone, a condenser microphone, or an electret condenser microphone and other types of microphones. The sound receiver 16 may also be a combination of electronic components, analog-to-digital converters, filters, and audio processors that are able to receive sound waves (such as human voice, ambient sound, machine operation sound, etc.) and convert them into audio signals. In an embodiment, the sound receiver 16 is configured to receive the sound of a speaker to generate audio data (i.e., original media data). The sound receiver 16 may have a built-in digital signal processor for processing or encoding the audio signal.

The receiving device 20 may be a desktop computer, a notebook computer, a smart phone, a tablet computer, a server, a set-top box or other computing devices. The receiving device 20 includes (but is not limited to) a main processor 22, a transceiver 23 and a memory 24. In an embodiment, the receiving device 20 further includes a digital signal processor 21. The main processor 22 is coupled to the digital signal processor 21, the transceiver 23 and the memory 24. For the implementation modes and functions of the digital signal processor 21, the main processor 22, the transceiver 23, and the memory 24, please refer to the description of the digital signal processor 11, the main processor 12, the transceiver 13, and the memory 14, respectively, and no further details are repeated here.

In an embodiment, the receiving device 20 further includes a display 27. The display 27 is coupled to the digital signal processor 21. The display 27 may be a liquid-crystal display (LCD), a light-emitting diode (LED), an organic light-emitting diode (OLED), a projector and other displays with various displaying technologies.

In an embodiment, the receiving device 20 further includes a speaker 28. The speaker 28 is coupled to the digital signal processor 21. The speaker 28 may be a horn or a loudspeaker. In an embodiment, the speaker 28 is configured to play sound. The aforementioned display 27 and/or speaker 28 may also be replaced by video and/or audio output interfaces, such as DVI or HDMI interfaces.

The network 30 may be a private network or a public network (e.g., the Internet), or a combination of both.

Hereinafter, the method described in the embodiments of the present disclosure will be illustrated in conjunction with various devices, components and modules in the system 1. Each step of the method may be adjusted according to the implementation situation, and is not limited thereto.

Figure 2:
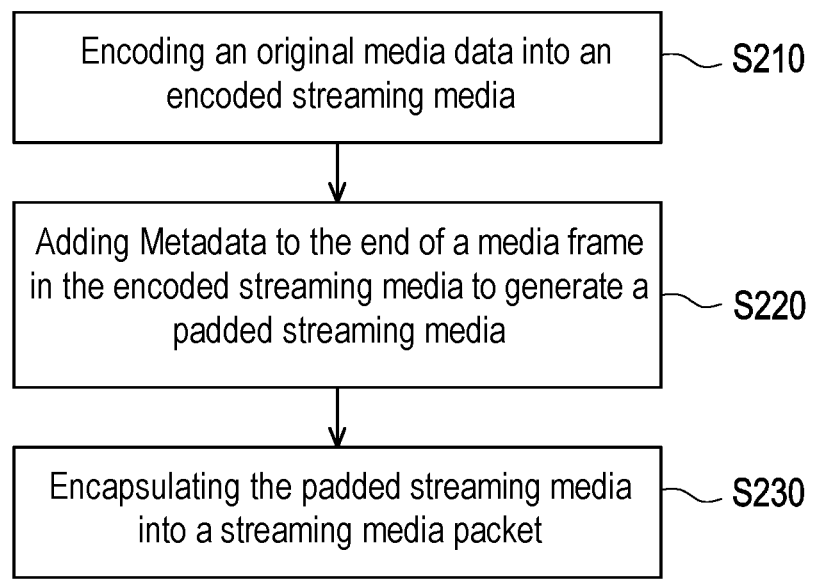
FIG. 2 is a flowchart of a processing method of streaming media according to an embodiment of the present disclosure.

FIG. 2 is a flowchart of a processing method of streaming media according to an embodiment of the present disclosure. Referring to FIG. 2, the main processor 12 encodes the original media data into encoded streaming media through the digital signal processor 11 (step S210). Specifically, the original media data may be video data (e.g., image RGB/YUV format) generated by the image capturing unit 15 and/or audio data (e.g., sampled sound signals) generated by the sound receiver 16. The digital signal processor 11 may compress or encode video data into a corresponding format based on, for example, H.264/AVC, H.265/HEVC, MJPEG, VP9, AV1 or other video compression techniques. Alternatively, the digital signal processor 11 may compress or encode the audio data into a corresponding format based on, for example, AAC, MP3, LDAC or other audio compression techniques.

The main processor 12 pads metadata (e.g., metadata) to the end of a media frame (e.g., image frame or audio sample) in the encoded streaming media to generate a padded streaming media (step S220). Specifically, the encoded streaming media includes several media frames. Media frames may be video frames and/or audio frames. In an embodiment, the main processor 12 may detect the target object in the original media data or the media frame. For example, the target object is a person, package, animal or vehicle. The main processor 12 may generate metadata according to the detection result of the target object. The data type of the metadata may be text, voice and/or image. In an embodiment, the metadata may include an event, time, location and/or direction related to the target object, such as the time at which a person appears in the video, the location of the person or the direction of a sound. In other embodiments, the metadata may also be predefined or received from user input operations.

Figures 3, 4:
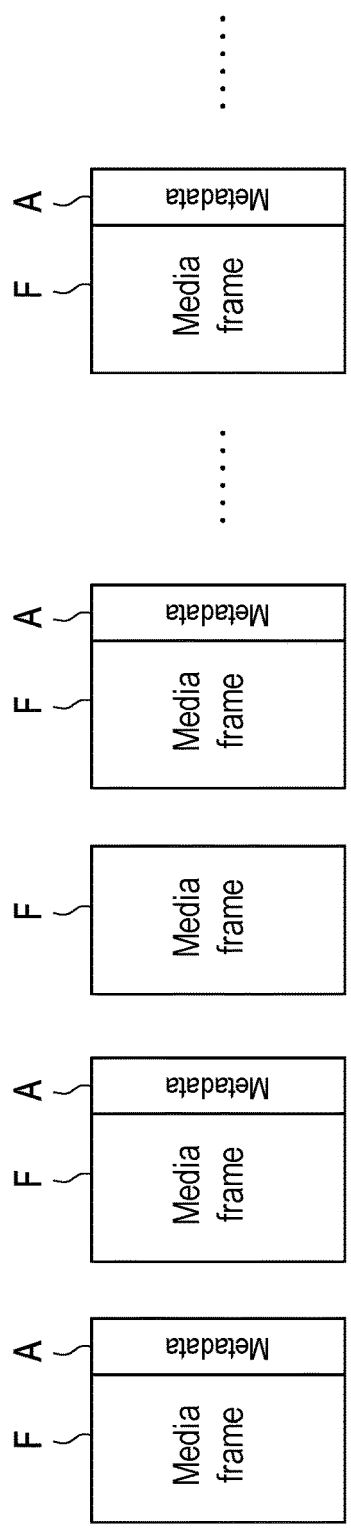
FIG. 3 is a schematic view illustrating adding metadata according to an embodiment of the present disclosure.
FIG. 4 is a format of metadata according to an embodiment of the present disclosure.

The main processor 12 uses the metadata as (new) data of the media frame. That is, (new) data is added to the original data of the media frame to form a new media frame. The padded streaming media includes new media frames. In an embodiment, the main processor 12 may pad metadata at the end of the media frame. That is, the metadata follows the original data of the media frame. For example, FIG. 3 is a schematic view illustrating adding metadata A according to an embodiment of the present disclosure. Referring to FIG. 3, metadata A is added at the end of one or more media frames F. It should be noted that each metadata may correspond to the content of the added media frame, and metadata may be added to a specific frame of media according to actual needs.

In an embodiment, the header of the metadata includes an information identifier, such as "000" or "111". The header of the metadata is at the head end of the metadata. The information identifier is utilized to distinguish the original data of the media frame from the metadata. That is, starting from the head end, when the information identifier is read from the media frame, the subsequent data is the metadata.

FIG. 4 is a format of metadata according to an embodiment of the present disclosure. Referring to FIG. 4, the metadata includes information identifier, command, padding length, data, total length and end symbol. However, the information format is not limited thereto.

In an embodiment, the main processor 12 may modify the header of the media frame. The modified content is related to added metadata, such as increasing the frame length, or modifying the identifier.

Referring to FIG. 2, the main processor 12 encapsulates the padded streaming media into streaming media packets through the transceiver 13 (step S230). Specifically, the streaming media data packet may conform to real-time transport protocol (RTP), real time streaming protocol (RTSP) or other streaming media-related protocols. Since the metadata serves as a part of the payload data of the media frame, it does not affect encapsulating of the streaming media. The main processor 12 may transmit streaming media data packets via the network 30 through the transceiver 13.

Figure 5:
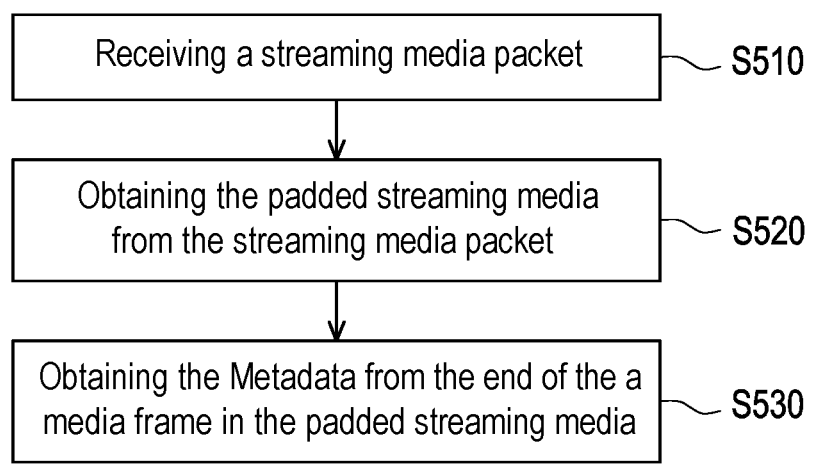
FIG. 5 is a flowchart of a processing method of streaming media according to an embodiment of the present disclosure.

FIG. 5 is a flowchart of a processing method of streaming media according to an embodiment of the present disclosure. Referring to FIG. 5, the main processor 22 receives the streaming media data packet via the network 30 through the transceiver 23 (step S510). The main processor 22 obtains the padded streaming media from the streaming media data packet through the transceiver 23 (step S520). That is, the transceiver 23 receives and parses streaming media data packets by using the same or compatible protocol. For example, the transceiver 23 parses the RTP packets and obtains the padded streaming media accordingly.

The main processor 22 obtains metadata from the end in the streaming media to which streaming media has been padded (step S530). As described above, the metadata is used as the payload data of the media frame in the padded streaming media, and the original data of the media frame is generated by encoding the original media data. The main processor 22 will extract the metadata from one or more media frames. In an embodiment, the header of the metadata includes an information identifier. The main processor 22 may look up the information identifier in one or more media frames in the padded streaming media. The main processor 22 may distinguish the original data of the media frame from the metadata according to the position of the information identifier. Metadata is added to the end of the media frame. As long as the information identifier is read from any media frame, the data following the beginning of the identifier in the information media frame is the metadata, and the metadata may be extracted accordingly.

In an embodiment, the main processor 22 may separate the metadata from the padded streaming media to restore the encoded streaming media. That is, the metadata in the padded streaming media is removed. If the header of the media frame is modified when the transmitting device 10 generates the padded streaming media, the header may be restored altogether. For example, the frame length is modified into the length of the original data. The encoded streaming media is ready for playback. For example, the digital signal processor 21 decodes the encoded streaming media and plays video data through display 27 and/or audio data through the speaker 28. In another example, the receiving device 20 serves as a streaming media server, and the encoded streaming media may be stored in the memory 24, and the main processor 22 transmits the encoded streaming media to other devices through the transceiver 23 when required.

In an embodiment, when the display 27 and/or the speaker 28 plays the encoded streaming media, the main processor 22 provides metadata according to the corresponding media frames. That is, when a specific media frame is played, the originally added metadata is provided. For example, while displaying the video on the display 27, event marking is performed in the video.

In an embodiment, the main processor 22 may directly play the padded streaming media through the display 27 and/or the speaker 28 or other playback devices. That is, the metadata is not removed from the padded streaming media. Since the metadata is added at the end of the media frame, the metadata does not affect the original data of the media frame and does not affect the decoding performed by the digital signal processor 21, thus ensuring compatibility.

To sum up, in the streaming media processing method, transmitting device and receiving device in the embodiments of the present disclosure, the method of transmitting metadata along with the data stream is defined beyond the specification of existing streaming media format. On the premise of not affecting the codec and data transmitting methods as well as communication protocols, the metadata is added by using metadata as the payload data of the media frame. In this way, the requirement that the user and the system need to simultaneously acquire the additional metadata and the streaming media data may be met.

Finally, it should be noted that: the above embodiments are only used to illustrate the technical solutions of the present disclosure, rather than limiting them; although the present disclosure has been described in detail with reference to the foregoing embodiments, those of ordinary skill in the art should understand that: it is still possible to modify the technical solutions described in the foregoing embodiments, or make equivalent replacements for some or all of the technical features; and these modifications or replacements do not make the essence of the corresponding technical solutions deviate from the scope of technical solutions in the various embodiments of the present disclosure.

What is claimed is:

1. A streaming media processing method, comprising:
    encoding an original media data into an encoded streaming media by a compression format, wherein the original media data comprise a plurality of original media frames, and the original media frames are encoded as encoded media frames of the encoded streaming media;
    generating one or more new media frames by adding metadata, which is serving as new data of a payload data of one or more of the encoded media frames, to end of an original data of the payload data, so as to form a padded streaming media from the encoded streaming media, wherein the metadata is not encoded by the compression format; and
    encapsulating the padded streaming media into a streaming media packet by treating the metadata and the original data of the payload data as a whole payload data of each of the new media frames,
wherein a header of the metadata comprises an information identifier, wherein the information identifier is configured to distinguish the original data from the added metadata in the whole payload data of the new media frames according to a position of the information identifier.

2. The streaming media processing method according to claim 1, wherein the step of adding the metadata to the encoded media frames in the encoded streaming media comprises:
modifying headers of the encoded media frames, wherein modified contents are related to adding the metadata.

3. The streaming media processing method according to claim 1, further comprising:
detecting a target object in the original media data or the original media frames; and
generating the metadata according to a detection result of the target object, wherein the metadata comprises an event, a time, a location and/or a direction related to the target object.

4. The streaming media processing method according to claim 1, further comprising:
receiving a streaming media packet through a network;
obtaining the padded streaming media from the streaming media packet; and
obtaining the metadata from the end of the padded media frames in the padded streaming media, comprising:
looking up an information identifier in the padded media frame in the padded streaming media, wherein a header of the metadata comprises the information identifier; and
distinguishing an original data of the padded media frame from the metadata according to a position of the information identifier.

5. The streaming media processing method according to claim 1, further comprising:
receiving the streaming media packet through a network;
obtaining the padded streaming media from the streaming media packet;
obtaining the metadata from an end of a padded media frame in the padded streaming media;
separating the metadata from the padded streaming media to restore the encoded streaming media, wherein the encoded streaming media is configured for playback; and
providing the metadata according to a corresponding encoded media frame when playing the encoded streaming media.

6. A transmitting device, comprising:
a memory, configured to store program codes;
a digital signal processor;
a transceiver; and
a main processor, coupled to the memory, the digital signal processor and the transceiver, and configured to load and execute the program codes to:
encode, by the digital signal processor, an original media data into an encoded streaming media by a compression format, wherein the original media data comprise a plurality of original media frames, and the original media frames are encoded as encoded media frames of the encoded streaming media;
generate one or more new media frames by adding metadata, which is serving as new data of a payload data of one or more of the encoded media frames, to end of an original data of the payload data, so as to form a padded streaming media from the encoded streaming media; wherein the metadata is not encoded by the compression format; and
encapsulate, by the transceiver, the padded streaming media into a streaming media packet by treating the metadata and the original data of the payload data as a whole payload data of each of the new media frames,
wherein a header of the metadata comprises an information identifier, wherein the information identifier is configured to distinguish the original data from the added metadata in the whole payload data of the new media frames according to a position of the information identifier.

7. The transmitting device according to claim 6, wherein the main processor is further configured for:
modifying headers of the encoded media frame, wherein modified contents are related to adding the metadata.

8. The transmitting device according to claim 6, wherein the main processor is further configured for:
detecting a target object in the original media data or the original media frames; and
generating the metadata according to a detection result of the target object, wherein the metadata comprises an event, a time, a location and/or a direction related to the target object.

9. A receiving device, comprising:
a memory, configured to store storing program codes;
a transceiver; and
a main processor, coupled to the memory and the transceiver, and configured to load and execute the program codes to:
receive, by the transceiver, a streaming media packet through a network;
obtain, by the transceiver, a padded streaming media from the streaming media packet; and
obtain metadata from an end of a media frame in the padded streaming media, comprising:
looking up an information identifier in the media frame of the padded streaming media,
wherein a header of the metadata comprises the information identifier; and
distinguishing an original data of a payload data of the media frame from new data of the payload data of the media frame according to a position of the information identifier,
wherein the streaming media packet is encapsulated, by treating the metadata and the original data of the payload data as a whole payload data of the media frame, by the padded streaming media, and the original data of the payload data of the media frame is an encoded media frame which is generated by encoding an original media frame by a compression format,
wherein the distinguished new data of the payload data of the media frame is identified as the metadata, wherein the distinguished new data is not encoded by the compression format.

10. The receiving device according to claim 9, wherein the main processor is further configured for:
separating the metadata from the padded streaming media to restore the encoded streaming media, wherein the encoded streaming media is configured for playback; and
providing the metadata according to a corresponding encoded media frame when playing the encoded streaming media.

* * * * *